C. P. PUTNAM.
CUSHIONING MEANS FOR VEHICLES.
APPLICATION FILED JAN. 13, 1916.
1,201,622.
Patented Oct. 17, 1916.
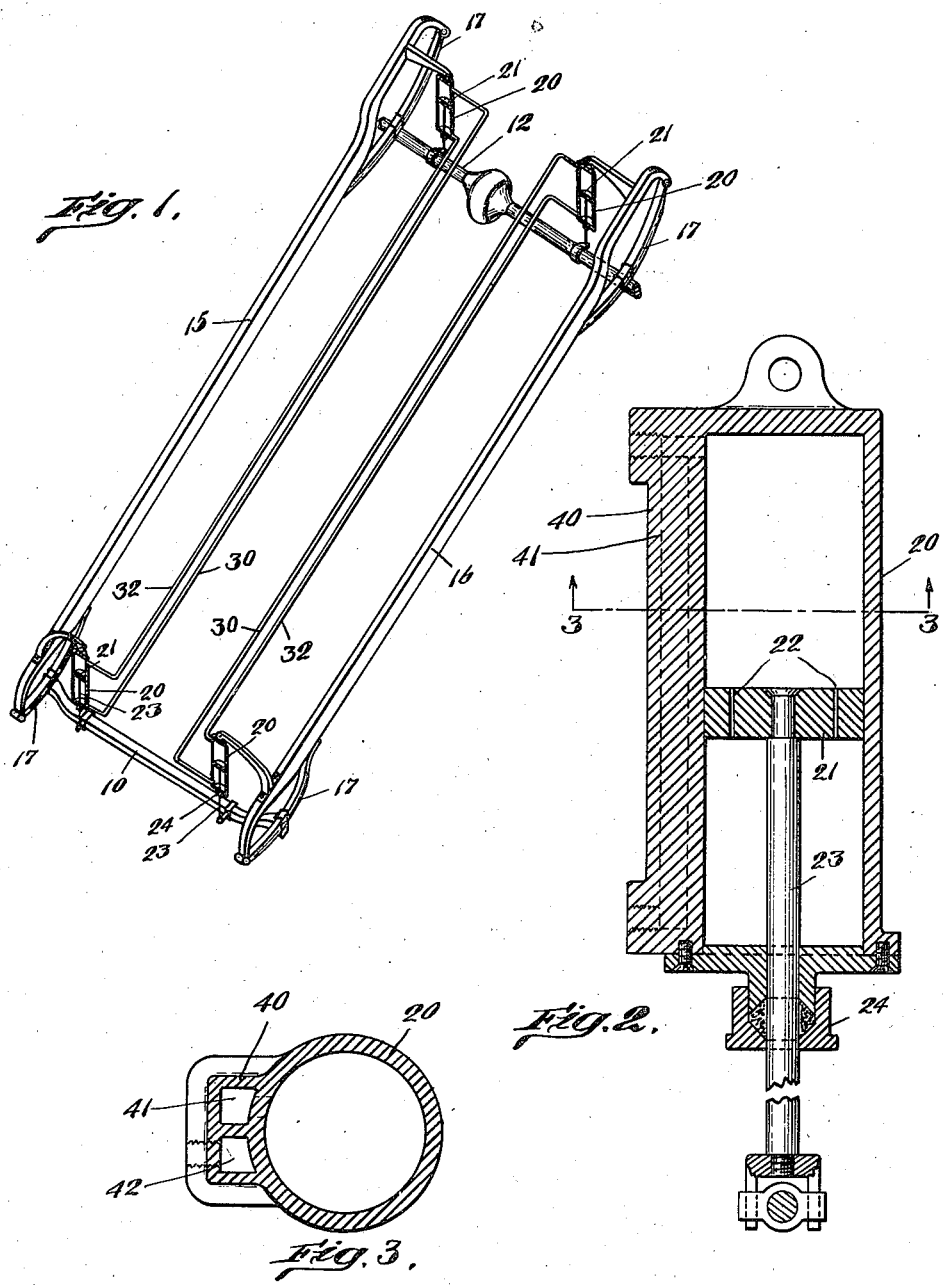

UNITED STATES PATENT OFFICE.

CHARLES P. PUTNAM, OF SAUGUS, MASSACHUSETTS.

CUSHIONING MEANS FOR VEHICLES.

1,201,622.  Specification of Letters Patent.  Patented Oct. 17, 1916.

Application filed January 13, 1916. Serial No. 71,972.

*To all whom it may concern:*

Be it known that I, CHARLES P. PUTNAM, a citizen of the United States, residing at Saugus, in the county of Essex and State of Massachusetts, have invented an Improvement in Cushioning Means for Vehicles, of which the following is a specification.

This invention relates to cushioning means for vehicles, adapted to be used on vehicles which are provided with metallic or other supporting springs, the cushioning means being supplementary thereto.

The main object of the invention is the construction of a cushioning means arranged for connection with both the front and rear axles and with the body-supporting frame, and adapted for coöperation; whereby the pressure or thrust, due to a shock received at either end of the vehicle, will be transmitted to the other end thereof, in a corresponding direction, so that the vehicle body will have a tendency to rise and fall as a unit, and maintain at all times approximately a horizontal plane.

The cushioning-means involves the employment of cylinders and pistons, so that the responsive action is more or less sluggish, there being preferably two cylinders and pistons at each end of the vehicle; the cylinders being connected with one and the pistons with the other relatively movable element.

In order that the main object of my invention may be accomplished, coöperation being secured, the cylinders at one end of the vehicle are connected with corresponding cylinders at the other end, by suitable conduits, and two conduits are provided for each pair of cylinders, one connecting the lower end of a front cylinder with the upper end of a rear cylinder, and the other connecting the lower end of the rear cylinder with the upper end of the front cylinder. These conduits admit of the transmission of pressure from the front to a rear cylinder, and vice versa, as occasion may require, so that equalization of the pressure or thrust is established at both ends of the vehicle, with the result that the vehicle body rises and falls as a unit, as contrasted with one end rising as the other falls, as is now common.

Figure 1 is a perspective view illustrating conventionally the front and rear axles and body supporting frame and cushioning means embodying my invention. Fig. 2 is an enlarged vertical section of one of the cylinders and pistons. Fig. 3 is a transverse section of a cylinder taken on a dotted line 3—3 of Fig. 2.

10, 12, represent, respectively, the front and rear axles; 15, and 16, the side bars of a body-supporting frame arranged on springs 17 connected with the axles. These relatively movable elements are here shown merely for the purpose of illustrating, in a simple manner, my invention as applied to said relatively movable elements.

20 represents one of the cylinders, and 21 a piston arranged in said cylinder, here shown as having leak holes 22, through it, the piston rod 23 of which passes through a suitable stuffing-box 24, provided at one end of the cylinder. These elements, namely, the cylinder and piston, are arranged to be connected by suitable means, respectively, with the relatively movable elements, as, for instance, one to the axle, and the other to the body-supporting frame.

In Fig. 1, four cylinders and pistons are employed; two at the front, and two at the rear of the vehicle, and the pistons are connected with the axles, and the cylinders are connected with the body-supporting frame, but, of course, this arrangement may be reversed. Each front cylinder is adapted to be connected with either one of the rear cylinders by conduits of suitable form, and the cylinders and conduits are adapted to contain oil or other fluid. As here shown two separate conduits 30 and 32 are provided for connecting together each front and rear cylinder. One of said conduits is arranged for connecting the lower compartment of a front cylinder and with the upper compartment of a rear cylinder; and the other conduit is arranged for connecting the upper compartment of the front cylinder with the lower compartment of the rear cylinder. The pistons will be arranged substantially midway the length of the cylinder, between the conduit connections, so that the oil is contained in compartments both above and below the pistons. In case front and rear cylinders on the same side of the machine are connected together, then at each side of the vehicle an equalized unit is provided, each unit comprising a pair of cylinders and separate conduits connecting respectively the upper and lower compartments thereof.

In operation, assuming a sudden upward thrust on the piston of a front cylinder, then the pressure is transmitted in an upward direction in said cylinder, tending to cause said cylinder to rise, and the pressure is also continued along the conduit 32, to the lower end of the rear cylinder, and exerts its force in an upward direction in said rear cylinder against the piston therein contained, tending to cause said rear piston to rise, and produce pressure in the upper compartment of said rear cylinder which is transmitted through the conduit 30 to the lower compartment of the front cylinder tending to prevent said front cylinder from unduly rising. The resultant effect is that the body-supporting frame is caused to rise bodily in substantially a horizontal plane from end to end, although its movement is more or less restrained on account of the restraining influence of the pistons and cylinders.

In the structure here shown, the cylinders are or may be made alike, and each cylinder has an extension 40 on one side, which is extended throughout its length, and such extension has two longitudinal passages 41 and 42, and one of said passages is in open communication with the interior of a cylinder at one end thereof, and the other passage is in open communication with the cylinder at the other end thereof, and the other passage is in open communication with the cylinder at the other end thereof, and tapped holes are provided to which the ends of the conduits may be connected with said passages. This particular structure, however, is not material, in so far as the gist of my invention is concerned.

I claim:—

1. The combination with a body-supporting frame and front and rear axles of the vehicle, of cushioning-means comprising cylinders and pistons arranged in connection, respectively, with the body-supporting frame and front and rear axles, a conduit connecting a front cylinder below its piston with a rear cylinder above its piston, and another conduit connecting said rear cylinder below its piston with said front cylinder above its piston, the pistons being arranged in the cylinders intermediate the conduit connections, whereby the pressure due to a movement of either piston in either direction is equalized throughout the unit and the body-supporting frame caused to rise and fall as a whole, maintaining approximately a horizontal plane.

2. The combination with a body-supporting frame and front and rear axles of the vehicle, of cushioning-means comprising cylinders and pistons arranged in connection, respectively, with the body-supporting frame and front and rear axles, and a conduit connecting the opposite ends of the front and rear cylinders, thus to transmit the pressure from one to the other cylinder.

3. The combination with a body-supporting frame and front and rear axles of the vehicle, of cushioning-means comprising cylinders and pistons arranged in connection, respectively, with the body-supporting frame and front and rear axles, two conduits, one connecting the opposite ends of a front and rear cylinder, and the other connecting the other ends of said cylinders, whereby the pressure is transmitted from each cylinder to the other and is equalized.

In testimony whereof, I have signed my name to this specification, in the presence of two subscribing witnesses.

CHARLES P. PUTNAM.

Witnesses:
  B. J. NOYES,
  H. B. DAVIS.